APPARATUS AND METHOD FOR CUTTING CONTOURS IN CUSHIONS

Filed Sept. 22, 1967

INVENTORS
CLETUS H. YOUNG
JAY E. YOUNG

David Rabin
attorney

APPARATUS AND METHOD FOR CUTTING CONTOURS IN CUSHIONS

Filed Sept. 22, 1967 5 Sheets-Sheet 2

*INVENTOR.*
CLETUS H. YOUNG
JAY E. YOUNG

APPARATUS AND METHOD FOR CUTTING CONTOURS IN CUSHIONS

Filed Sept. 22, 1967

*INVENTOR.*
CLETUS H. YOUNG
JAY E. YOUNG

APPARATUS AND METHOD FOR CUTTING CONTOURS IN CUSHIONS

Filed Sept. 22, 1967 5 Sheets-Sheet 4

*INVENTOR.*
CLETUS H. YOUNG
JAY E. YOUNG

APPARATUS AND METHOD FOR CUTTING CONTOURS IN CUSHIONS

Filed Sept. 22, 1967 5 Sheets-Sheet 5

*INVENTOR.*
CLETUS H. YOUNG
JAY E. YOUNG

United States Patent Office 3,548,542

Patented Dec. 22, 1970

3,548,542

APPARATUS AND METHOD FOR CUTTING CONTOURS IN CUSHIONS

Cletus H. Young, High Point, and Jay E. Young, Thomasville, N.C., assignors to High Point Fabricators, Inc., High Point, N.C., a corporation of North Carolina

Continuation-in-part of application Ser. No. 438,948, Mar. 11, 1965. This application Sept. 22, 1967, Ser. No. 675,735

Int. Cl. B26d *1/46*

U.S. Cl. 51—5 18 Claims

ABSTRACT OF THE DISCLOSURE

This invention concerns apparatuses and a method for cutting contours in polyurethane cushions and relates more particularly to devices for supporting and conveying polyfoam cushions along a directed path of travel into a transversely positioned longitudinally cutting blade in which adjustably curved portions of the blades cut the prescribed contours or curvatures in selected portions of the cushions.

This application is a continuation-in-part of my now pending application Ser. No. 438,948, filed Mar. 11, 1965.

BACKGROUND, SUMMARY AND OBJECTIVES OF THE INVENTION

It is customary in the cushion and mattress art to fabricate furniture component sections of polyurethane foam or other commonly used materials as disclosed in U.S. Pat. Nos. 2,862,214 and 2,925,856 wherein rounded corners or contours are provided by curving flat sheet stock as needed. It is also well known in cushion constructions that the thickness of the polyurethane cushion may vary depending upon the flat thickness of the cut bun, and various surface configurations such as disclosed in U.S. Pat. No. 2,785,739 may be achieved. However, curvatures and contours in cushions for chair and sofa backs and couch components made from polyurethane have generally been formed by buffing machines such as disclosed in U.S. Pat. No. 3,133,380 in which the polyfoam is abraded either by wire bristles or other suitable abrading members to produce the requisite curvature though the surface of the curvature may remain relatively rough or fuzzy. In addition, the desired cushion curvature may be achieved by utilizing a heated wire or blade shaped in the desired configuration to burn through the polyfoam, however, the cushion formed from polyfoam cut by the hot wire method may have encrustations on the seared surface among other objectionable characteristics.

The procedures presently employed in the construction of cushions, mattresses, and chair backs and the like utilizing heated wire elements and buffing or abrading machines are not only time consuming and costly but result in non-uniform products.

The present invention has been designed to overcome the objections enumerated which are inherent in conventional contouring machines and processes, and the apparatus comprises, in the broadest sense, a supported movable surface which is adapted to receive and displace a polyfoam cushion block for shaping. The apparatus is provided with an endless cutter blade which encircles the supported movable surface. The blade has cooperating guide devices for directing the path of blade travel through a prescribed adjustable contour during cutting of a foamed cushion supported on the surface. The cushion may be reciprocated inwardly against the blade and retracted upon completion of the cutting operation, or it may be continuously moved in a directed path of travel on an endless conveyor against and through the cutter blade thus passing to the opposite side of the frame for subsequent collection.

Appropriate means are provided for driving the cutter blade and the movable supporting surface, and additional devices are provided to position precisely either vertically or horizontally the cushion with respect to the cutter blade as well as retain the cushion in the selected position during the cutting operation. The cushion may be contoured along the corners or edges of it may be contoured on the upper and lower surfaces depending on the particular product desired. Buffing devices are strategically positioned to smooth the cut surfaces and edges after the cutting operation has been completed in the event this operation is necessary.

Accordingly, it is an objective of this invention to provide a method and apparatus for cutting uniformly defined contours or curvatures in polyurethane or foamed cushions, mattresses, and components for chair and sofa backs.

Another object of this invention is to provide an apparatus for supporting a polyfoam cushion and for cutting a desired configuration in the cushion by means of an endless blade suitably guided to achieve the desired contour configuration.

Still a further object of the present invention relates to a method of supporting a cushion and conveying it along a directed path of travel against an endless blade guided to form a curvature in the cushion.

Yet still another object of the present invention is to provide an apparatus of the type described for supporting a polyurethane cushion and a guided blade and forming a contour or curvature in the cushion by relative movement between the cushion and the blade.

Yet another further object of the present invention is to provide a movable cushion-supporting table and an endless blade having a predetermined curvilinear contour corresponding to the contour to be cut in the cushion, the apparatus having additional means for removing any corners or rough edges remaining on the cut cushion.

Yet still another further object of the present invention is to provide an apparatus to receive a pre-cut cushion planar surface while positioning the other planar surface against a cutter blade for similar shaping.

Numerous other advantages of this apparatus and method for cutting cushion contours will become more apparent to those skilled in the art from a consideration of the following detailed description taken in conjunction with the accompanying drawings wherein like characters of reference designate like parts throughout the several views.

FIGURE DESCRIPTION

FIG. 1 is a front perspective view of a contouring apparatus having a reciprocating cushion-supporting table and a cutting blade supported on the table and extending transversely across the path of supporting table travel.

FIG. 2 is an enlarged partial end view of the cutting blade guide members and blade of a contouring apparatus with a cushion mounted for cutting on the cushion-supporting table and a pair of motor driven buffers positioned at spaced apart locations against the cushion being cut.

FIG. 3 is an enlarged partial transverse sectional view taken substantially along the plane of section line 3—3 of FIG. 2.

FIG. 4 is a schematic view of an electrical circuit which may be employed for the automatic operation of the apparatus for cutting contours on polyfoam cushions, mattresses and the like.

DETAILED DESCRIPTION OF THE INVENTION

For the purpose of this description, the term "polyurethane foam" refers to that type of multi-cellular polyurethane conventionally used for relatively soft cushioning in seats, mattresses, chair and sofa backs and the like, as distinguished from the foamed rubber or latex foamed cushions. The polyurethane foam conventionally used may be of various densities and may also include compositions such as disclosed in U.S. Pat. No. 2,785,739. Furthermore, in this detailed description of the invention, the term "polyfoam" will refer to polyurethane foamed cushions and similar materials, and when the term "cushion" is employed, it will be equated with mattresses, sofa cushions, chair and sofa backs and other furniture elements or components in which polyurethane foam is employed.

Figures 1, 2, 3, 4:
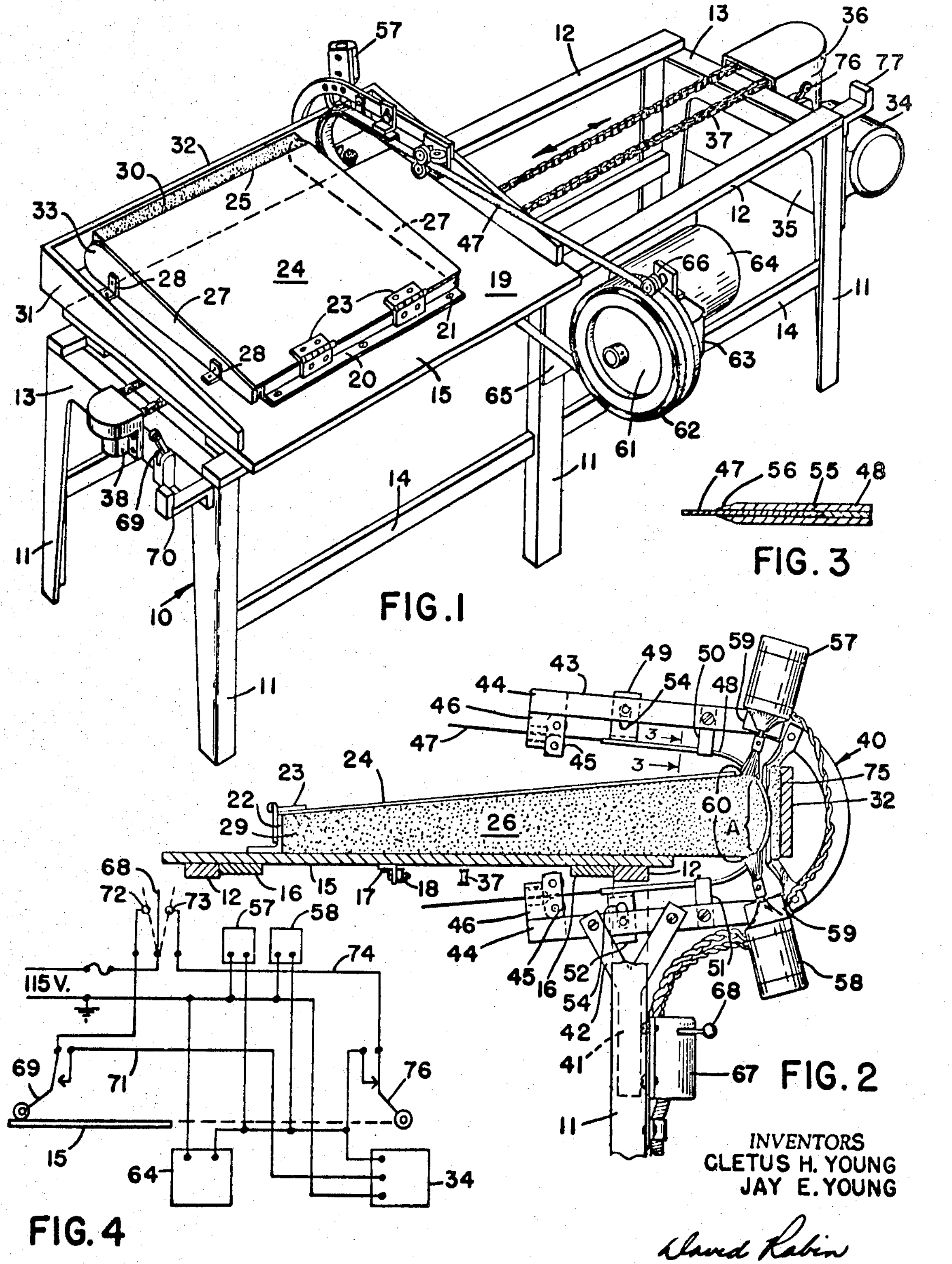

Referring now to the drawings and particularly to FIGS. 1 and 2, a reciprocating table-supporting framework 10 has vertically extending legs 11 suitably spaced apart from each other for supporting the horizontal table guide rails 12 that extend longitudinally of the framework and are parallel to each other. Transversely extending cross rails 13 reach between the front and rear legs, and a horizontal brace member 14 reaches between at least the front vertically extending legs for increased table stability.

A planar cushion-supporting table or conveyor 15 is mounted for sliding movement on the guide rails 12 with guide rail retaining members 16 secured to the bottom of the table or conveyor 15 extending longitudinally of the table and in sliding contact with the guide rails 12 constraining the table from lateral displacement during longitudinal movement. Also securely fastened to the bottom of the table 15 is an angle iron 17 to which is affixed a conveyor chain link securing lug 18.

Along one side of the upper surface 19 of table 15 is a longitudinally extending angle iron or bracket 20 having one leg secured flush to the upper surface 19 of the table 15 by means of bolts 21 suitably spaced along the member 20. The vertically projecting leg 22 of angle iron 20 has a pair of spaced apart hinges 23 securely affixed for pivotally supporting a cushion restraining cover member 24 having a forwardly extending free end 25 extending sufficiently to cover a major portion of a cushion of polyfoam positioned to rest on the table 15. Two laterally spaced-apart cushion-supporting end panels 27, each of which is supported by angle brackets 28, are secured to table 15 and panel 27 by suitable fastening members. The configuration of each of the end panels 27 may vary depending upon the cushion configuration which, in the embodiment illustrated, is divergent from the base 29 to the crown or top 30 and is to be used for the back of a chair or sofa. A partial perimetrical guard rail 31 is secured to the table 15 with the front portion 32 of the rail serving to position and align the cushion to be cut. In the embodiment illustrated, the desired contour in the cushion 26 will be cut along in the forward end 33 of the end panels 27.

A motor-driven chain drive mechanism 34 is mounted at one end of the framework 10 on the side panel 35 that is secured to the legs 11 and the cross member 13. A suitable guard housing 36 is provided to cover a chain sprocket wheel (not shown) on which the endless longitudinally extending flexible chain 37 is mounted. At the other end of the frame 10 is an idler sprocket (not shown) rotatably mounted on the cross rail 13 within the guard housing 38. Horizontal reciprocation of table 15 is produced by alternate movement in the horizontal reaches or limits of the flexible chain 37 driven by its driving mechanism 34 with the chain 37 being securely fastened through at least one link thereof to the lug 18 beneath the table 15.

The cushion cutting blade assembly 40 is supported from a frame leg 11 by suitable fastening means through the bifurcated yoke 41 the ends 42 of which securely fasten the U-shaped frame 43. Adjacent to the terminal ends 44 of the U-shaped member 43 are supported pairs of blade guide rulers 45 revolvably mounted in supporting brackets 46 secured to the members 44. An endless cutting blade 47, preferably having serrated teeth, is guidably passed between the pairs of rollers 45 during travel of the blade. An arcuate U-shaped blade guide member 48 is adjustably supported by the U-shaped member 43 by suitable adjustably mounted brackets 49, 50, 51 and 52, each of which are securely fastened to the blade guide member 48 and adjustably mounted to the member 43 to enable the contour or curvature of the member 48 to be modified depending upon the desired contour to be cut in the cushion. Brackets 49, 50, 51 and 52 are provided with slotted openings 54 enabling the brackets to be displaced to achieve the requisite contour in member 48. The blade guide member 48 is provided with a blade-receiving recess or slot 55 for guidably supporting the blade during travel therein, and a section of the cutting blade 47 is exposed beyond the converging ends 56 of the guide member 48.

The radius of curvature of the blade guide member 48 in the embodiment illustrated in FIG. 2 which cuts the cushion contour is designated by the letter A. It is obvious this curvature A may be modified by displacing the brackets 49 through 52 outwardly or inwardly depending upon the contour desired.

In some cushions the radius of curvature may result in a corner or edge on the polyfoam where the blade 47 enters and leaves the cushion, the extent of which will vary depending upon the arc of curvature. It has been found desirable to remove such corners or edges by the use of suitably positioned motor-driven buffers 57 and 58 that are mounted securely through brackets 59 to the U-shaped member 43 with the abrading elements, wire bristles 60 in this instance, extending from the motor shaft to contact and remove the corners or edges of the polyfoam adjacent to the terminal edges of the cut cushion.

The endless cutting blade 47 is driven by the pulley 61 the periphery of which may be provided with a band 62 for frictional resistance against slippage of the blade 47. Pulley 81 is driven through suitable drive means 63 driven by the motor 64 mounted on the motor-mounting plate 65 secured to the frame 10. A belt guide roller 66 is mounted adjacent to the drive pulley 61 to retain the blade 47 on the band 62.

A manually operated electrical switch 67 is mounted on the leg 11 with an operator control handle 68 pivotally mounted to control table reciprocation through operation of the motor 34 controlling the direction of chain flight.

In FIG. 4, there is illustrated a schematic wiring diagram illustrating one preferred manner of automatically operating the cushion cutting apparatus with the reference characters corresponding substantially to the components heretofore described. Line current is supplied to the switch 68, the blade operating motor 64, and the table reciprocating motor 34. In the position illustrated in FIG. 4, the table 15 is in the extreme left position tripping the microswitch 69 when the table 15 has been moved to the extreme left position limited by the abutment 70 extending from the frame 10. The microswitch 69 is pivoted breaking the circuit in line 71 to the table operated motor 34 with the lever 68 shown in the broken line to the left contact position 72. A cushion to be cut may be positioned beneath the panel 24 and moved against the inside of member 32. Upon manual shifting of switch 69 to contact 73, current will flown through line 74 activating motor 34 and motor 64 thereby moving the table 15 to the right in FIGS. 1 and 4 and driving the blade 47 to cut through the polyfoam cushion 26 removing the section 75 as shown in FIG. 2. The brushes 60 will be driven by their motors 57 and 58 to remove any corners or edges on the cut cushion as the cushion is being cut until the table 15 strikes the microswitch 76 at the right of the frame 10 which is positioned in the path of table travel with the table travel to the right being limited by the upright lug 77 mounted to the frame 10. Upon contacting the microswitch 76, motors 34 and 64 and 57 and 58 will be de-energized. The table is then returned to the left position after the cushion is removed for reloading another cushion to be cut on the next cycle. It will be readily apparent that pairs of blades may be employed so that the cutting action may occur on each reciprocation of the table, however, cutting in one direction has been found to be very satisfactory with excellent results and high production.

It has been found advantageous, in numerous applications, to replace the reciprocating table 15 of the contour-forming apparatus with a continuous conveyor 78 so that polyfoam materials may be continuously fed to the cutting blade 47 in a more expeditious manner. A pair of dual retaining rollers 80 are provided when a conveyor 78 is used in lieu of the retaining cover member 24 previously described since the polyfoam material has a tendency to rise during the cutting operation and requires some means of restraint which will also permit continuous movement of the polyfoam thereunder. An additional retaining roller 82 is preferably provided rearward of the cutting blade 47 to maintain the cut polyfoam block next to the surface of the conveyor as it emerges from the blade.

Figures 5, 6, 7, 8, 9, 10:
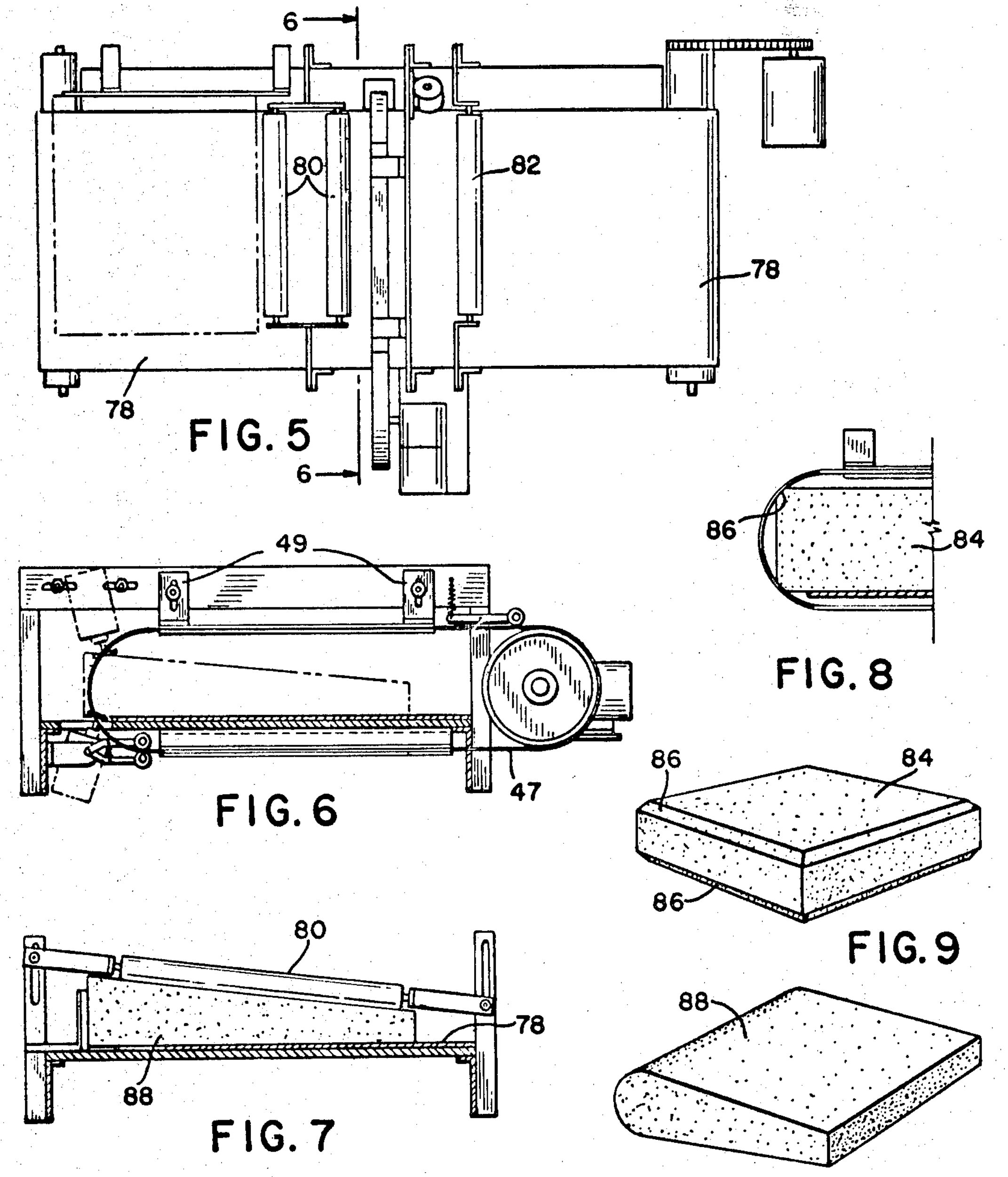
FIG. 5 is a plan view of another device for cutting contours in polyfoam cushions which is provided with roller holding means and a continuous conveyor for feeding the polyfoam materials continuously against and through the cutter blade.
FIG. 6 is an enlarged partial transverse sectional view taken substantially along the plane of section line 6—6 of FIG. 5.
FIG. 7 is an end elevational sectional view taken along the plane of section line 7—7 of FIG. 5.
FIG. 8 is a sectional fragmentary view of an alternative prescribed cutter blade path as the cutter blade contours two sharp corners of a block of polyfoam material.
FIG. 9 is a perspective view of a polyfoam material block having the sharp corners removed by, for example, the contouring device shown in FIG. 8.
FIG. 10 is a perspective view of a block of polyfoam material wherein the leading edge of the material has been contoured in a semi-circular configuration by, for example, the contouring device shown in FIG. 6.
Figure 11:
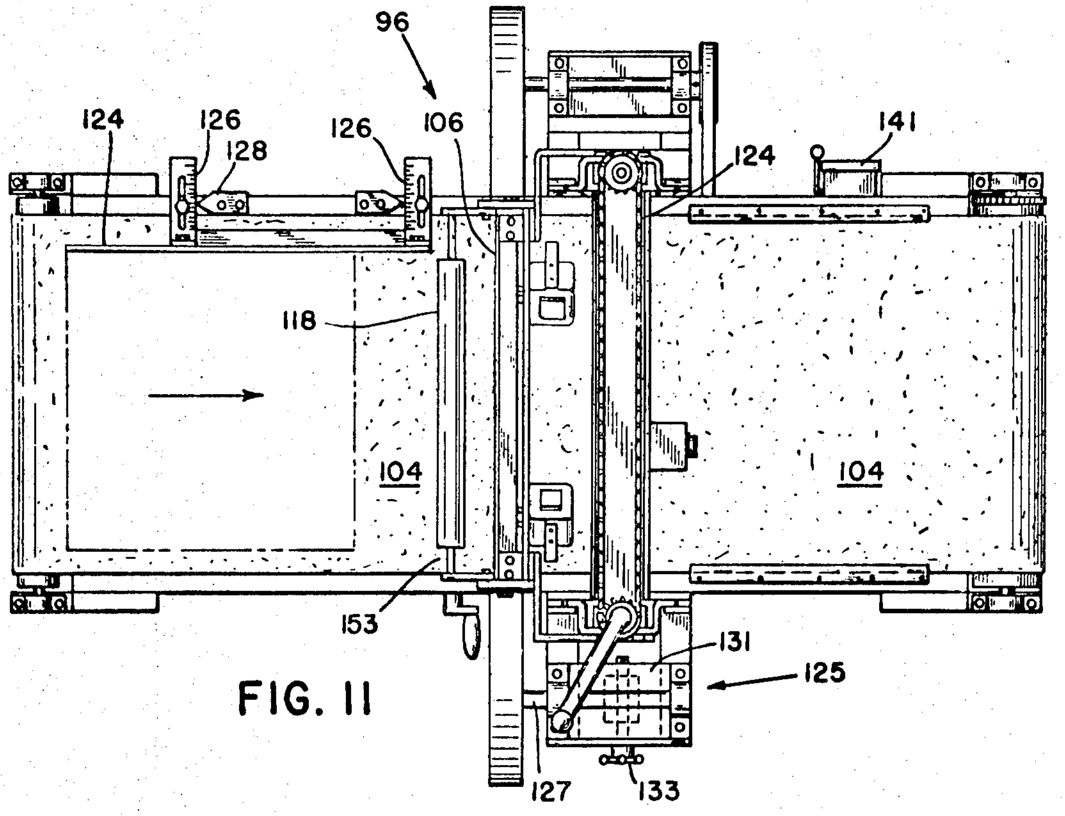
FIG. 11 is a plan view of another cushion contouring device adapted to contour the upper and lower planar surfaces of polyfoam cushions.
Figure 12:
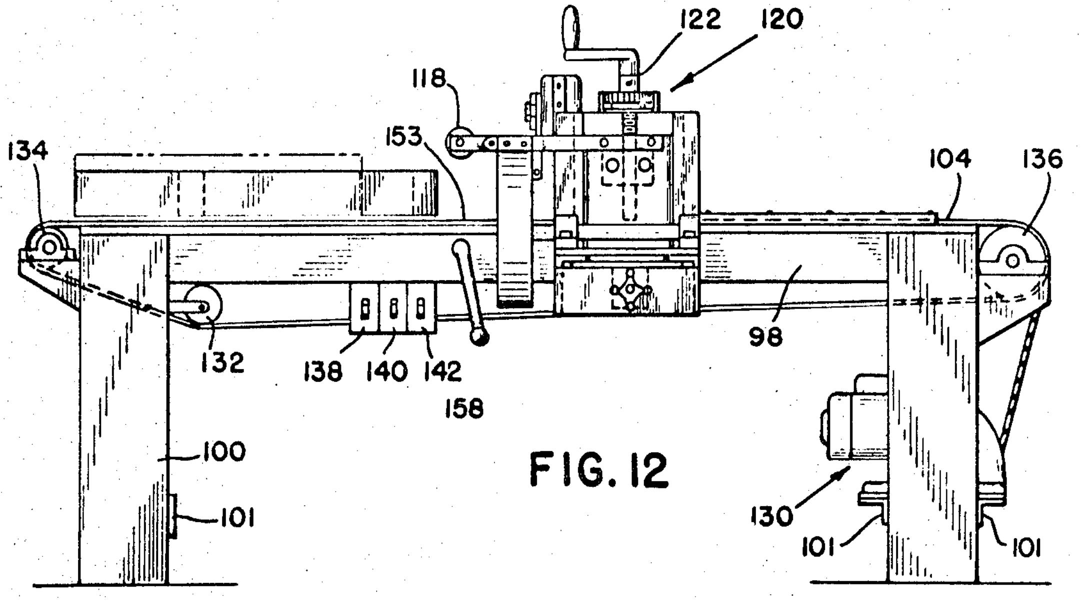
FIG. 12 is a side elevational view of the upper and lower cushion surface contouring device of FIG. 11 showing the cushion restraining device and the drive mechanism for the continuous conveyor.
Figure 13:
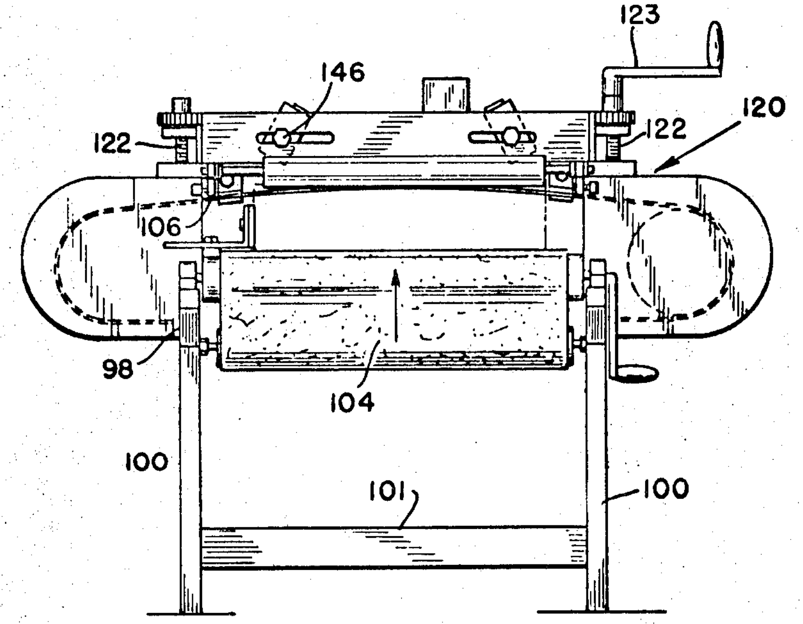
FIG. 13 is a front end elevational view of a device for contouring the upper and lower planar surfaces of a cushion showing the adjustable brackets for controlling the configuration of the cutter blade and the blade's movement with respect to the cushion and supporting conveyor of the machine.

FIG. 6 illustrates the positioning of the cutting blade 47 in a manner generally similar to that shown in FIG. 2, however, FIG. 8 illustrates still another variation in the cutting technique which will provide a cushion 84 (FIG. 9) having sharply cut or beveled edges 86 as opposed to the semi-circular edge-contoured cushion 88 (FIG. 10) resulting from positioning the blade as shown in FIGS. 2 and 9.

Thus the described devices are readily adaptable to the contouring of a leading or trailing edge or of specific corners of a polyfoam black constituting a cushion or the like, and any variation in the contour or contours may be accomplished by repositioning the blade by way of the blade guide means secured to the apparatus frame.

Figure 20:
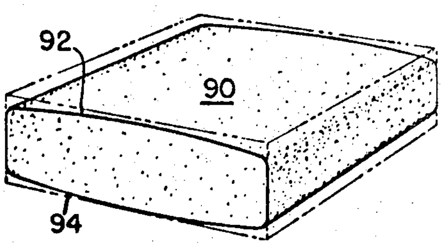
FIG. 20 is a perspective view of a contoured cushion which has been shaped by a device for contouring the upper and lower planar surfaces of the cushion and which has had its edges buffed by a buffer such as illustrated in FIG. 18.

While it is customarily and generally necessary only to contour cushions along leading and trailing edges for manufacturing furniture components and the like, there does arise in a great number of cases the need for a contour in the upper and lower planar surface of the cushion to produce a cushion article such as illustrated in FIG. 20 and designated 90. The upper and lower contoured surfaces 92 and 94 are generally symmetrical about the midportion of the cushion thickness and provide an attractive and functional component for a great number of uses.

Figure 14:
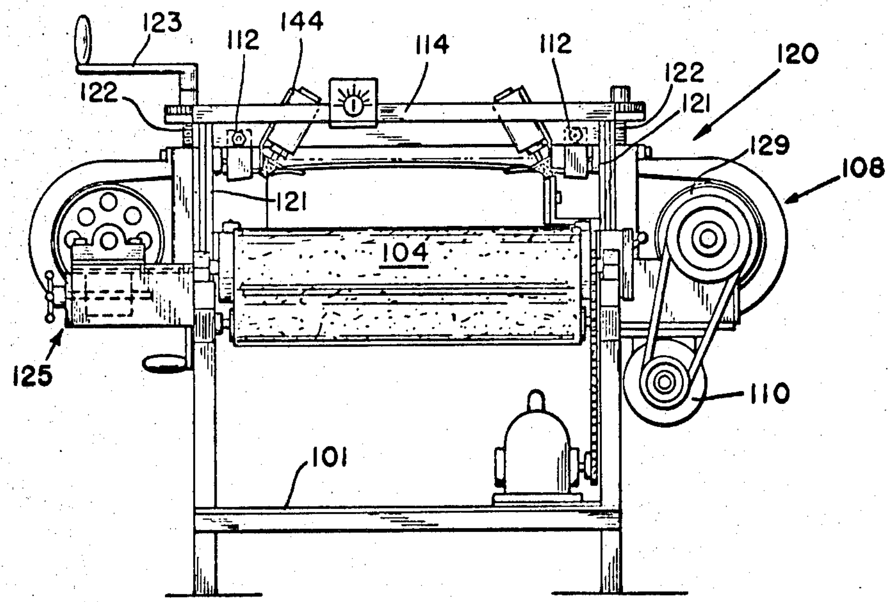
FIG. 14 is a rear end elevational sectional view of a device for contouring the upper and lower surfaces of a cushion showing the drive mechanism and the buffing members positioned adjacent the corners of a cushion being cut so that the rough cut edges developed as a result of the cutting may be buffed and smoothed.
Figure 15:
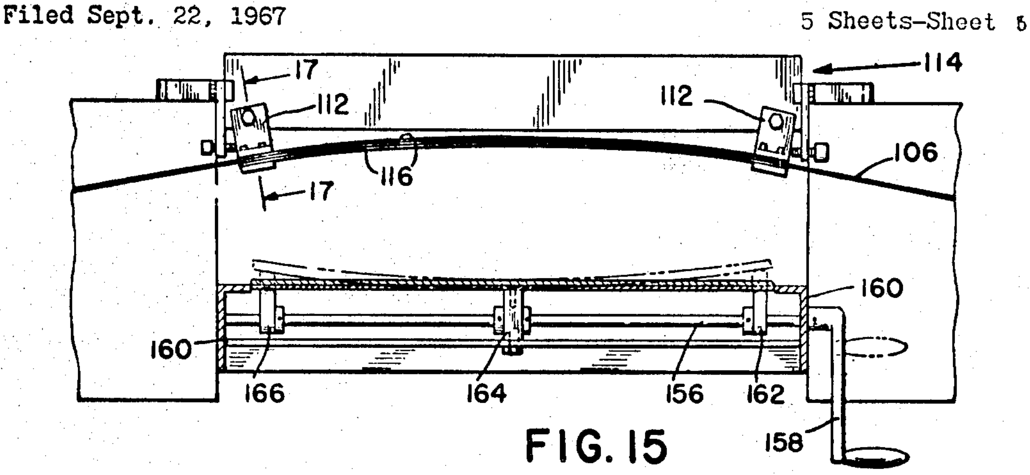
FIG. 15 is an enlarged sectional fragmentary view of the conveyor supporting mechanism and cutter blade guide assembly of a machine for contouring the upper and lower surfaces of a polyfoam cushion.

To meet this special requirement, the present inventive concept has been extended to the apparatus generally designated 96 having substantially the same components as the previously described device particularly shown in FIGS. 1 and 5. A frame 98 having suitable supporting legs 100 connected by transverse members 101 is positioned substantially horizontal to a supporting surface 102 at a height convenient for operation by an attendant. A continuous conveyor 104 is movably mounted to receive a polyfoam cushion block for movement into a cutter blade 106 driven by a drive assembly 108 and its controlling motor 110 in the manner illustrated in FIG. 14. A plurality of blade guide brackets 112 are securely attached to the superstructure 114 of the machine frame 98 so that the blade 106 may be positioned in a prescribed path to cut any contour desired in the planar surfaces of a cushion. A flexible bifurcated member 116 retains the cutter blade 106 in a prescribed configuration between brackets 112 so that adjustment of the brackets will change the cutting shape of the blade accordingly.

A restraining roller 118 is positioned forwardly of the cutter blade 106 and above the cushion being moved in toward the cutter blade 106 by the conveyor 104. The restraining roller 118 holds the cushion snugly against the conveyor during the cutting operation and avoids any tendency in the cushion to rise because of the shearing action of the blade.

The entire component carrying assembly shown generally as 120 may be raised or lowered within a pair of upstanding support plates 121 by elevating screws 122 simultaneously operated through a common linking sprocket 124 by the rotation of a crank 123 so that the entire mechanism is evenly raised or lowered as desired. The ability to position the assembly and the carried cutting blade allows the contouring of any thickness of cushions and will also affect the configuration of the contour cut when positioning of the assembly is considered in conjunction with the adjustment of guide brackets 112.

A cutter blade tensioning device generally designated 125 allows tightening of the cutter blade in the event the carrying assembly 120 has been elevated or lowered or in the event some contour change in the blade configuration has been made. The shaft 127 rotatably carrying the blade supporting fly wheel 129 is supported on a movable flange 131 which can be selectively displaced by means of a manually operated screw 133, the operation of which will move the fly wheel 129 either inwardly or outwardly of the conveyor so as to loosen or tighten the cutter blade.

A side guide rail 124 is adjustably maintained by movable and graduated brackets 126 in cnojunction with an indicator 128 so that a cushion may be precisely positioned in a horizontal relationship for introduction to the cutter blade 106.

The conveyor 104 is driven by conventional motor means 130 while suitably pulleys 132, 134 and 136 are provided to insure proper traction and tension of the conveyor during its movement through the carrying assembly 120.

A conventional electric control system is provided and is generally similar to that shown in FIG. 4 for the edge contouring device with switches 138, 140 and 142 controlling the conveyor 104, the cutter blade 106 and the buffers 144 respectively. The main power supply to the components of the machine is controlled through a fuse containing switch box 141 mounted on the side of the machine frame.

Figures 16, 17, 19:
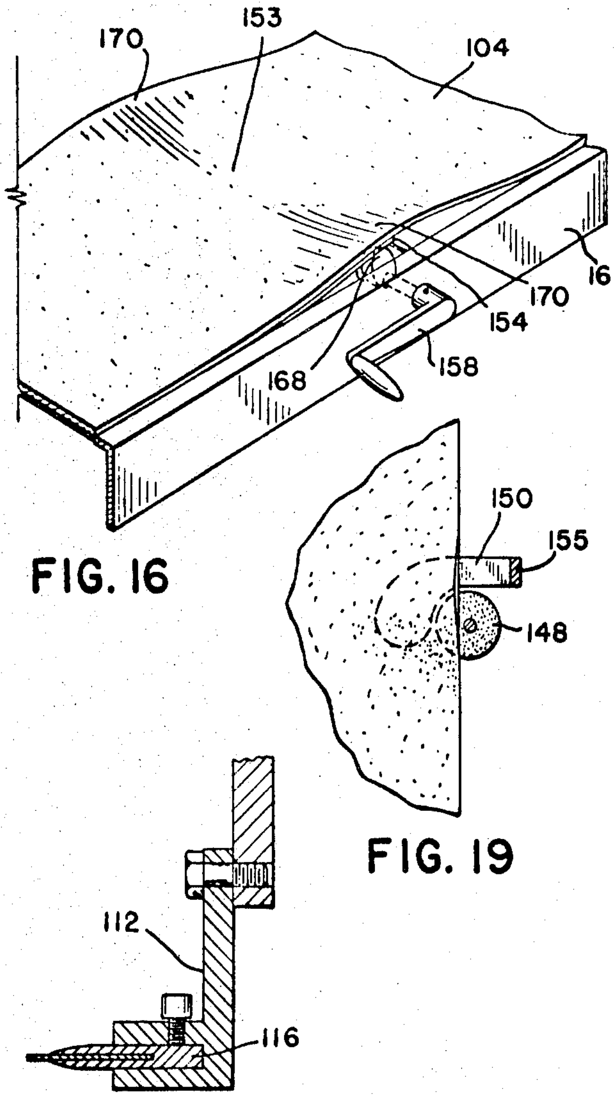
FIG. 16 is a perspective, fragmentary view of the contoured conveyor belt of a machine for contouring the upper and lower planar surfaces of a polyfoam cushion.
FIG. 17 is an enlarged, sectional end elevational and fragmentary view of one of the cutter blade guides of a machine for contouring the upper and lower planar surfaces of a polyfoam cushion.
FIG. 19 is a plan enlarged sectional and fragmentary view of the buffer of FIG. 18 showing the extending guide member which elevates the severed portion of the polyfoam material from the contoured cushion so that the freshly cut edge of the block may be buffed without interference.
Figure 18:
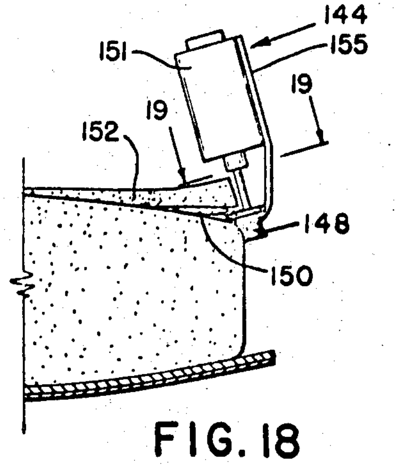
FIG. 18 is an enlarged end elevational sectional and fragmentary view of a buffer positioned to smooth the sharp corner of a cushion block resulting from the contouring of that cushion by the cutter blade.

The buffers 144 are positioned proximate the cutter blade 106 by securement to the superstructure 114 of the device 96 by adjustable brackets 146 or other suitable means so that the buffers may be positioned selectively to sand or smooth any rough cut edge of the polyfoam block. An abrasive cap 148 may be used to sand a cut corner of the block, however, any number of equally suitable devices might well be substituted including the wire brushes previously discussed which have been found to be most effective in rounding cut corners and the like. The buffer disclosed particularly in FIGS. 18 and 19 contains a guide member 150 extending from the buffer motor 151 support bracket 153 which is shaped to raise the upper cut and separated portion 142 of the polyfoam block (FIG. 18) so that the cap 148 can remain contiguous to the entire corner to be rounded and provide the smoothest possible surface. The adjustability of the buffers 144 allow their complete withdrawal in the event no buffing or smoothing is desired during the cutting operation.

Only one planar surface of a polyfoam block may be cut at a time on the machine 96 though suitable adjustments could be made to allow both surfaces to be cut simultaneously. It has been found advantageous when cutting one planar surface at a time to provide means for contouring the conveyor 106 during the cutting operation at a location 153 proximate the blade 106 so that no distortion of the cushion is achieved when cutting the second planar upper surface of the cushion after the first lower surface which is now contiguous the conveyor has been formed. To this end, a flexible, preferably metal member 154 is positioned beneath the conveyor 104 near the cutting blade 106, and a multiple cam-bearing rod 156, suitably rotated by means of a crank 158, extends between the side rails 160 of the conveyor and supports a plurality of particularly shaped cams 162 and 166 which will affect flexible member 154 as described below. The mid-portion of the member 154 is secured by a lug 164 to a member 165 affixed to the conveyor side rails 160. Thus rotation of the crank 158 will elevate the lobes 168 of cams 162 and 166 so that the outer ends of flexible member 154 are elevated as the mid-portion is held stationary and the conveyor 104 responds accordingly.

Because of the particular contour of conveyor 104 at this location, a cushion whose lower planar surface 94 has been contoured (FIG. 20) may be positioned to fit snugly within the contour of the conveyor and thus present an undistorted upper surface 92 for cutting by the blade 106 as the conveyor moves the cushion through that assembly. Obviously, any number of variations in the contour of the conveyor 104 may be achieved by a change in the cam configuration, and the conveyor may be returned to its normally flat shape upon the introduction of a polyfoam block for cutting along a first planar surface where the second planar surface of the cushion is uncut and flat.

Thus there has been described an apparatus for cutting contours in polyfoam cushions which is adapted to contour those cushions along leading or trailing edges or along upper or lower planar surfaces as described. Any number of alternate configurations may be achieved by the blade prescription which is controlled for the most part, by adjustable guide means mounted on the framework of the machine. The polyfoam cushions may be contoured by reciprocating each cushion into the cutting blade and returning the cushion for removal or by moving the cushions directly through the blade on a continuous conveyor. Buffers may be provided as desired at strategic locations to smooth the cut surfaces and edges of the cushions if that operation is desired, and the machine may be adjusted in any number of ways to accommodate cushions of varying size and shape.

It will be readily apparent to those skilled in this art that many modifications and improvements may be made in the present invention including the movable table or conveyor, the structural components for guidably supporting the cutting blade, the cushion guide and restraining members and the buffers as well as other aspects of the present invention without departing from the spirit and purpose of this disclosure and such modifications are contemplated within the scope of the appended claims.

In the claims:

1. An apparatus for contouring foamed cushions comprising: a frame; a conveyor carried by said frame receiving and supporting a cushion for shaping; an endless cutter blade transversely encircling said frame and said conveyor; means carried by said frame driving said blade; and blade guide means carried by said frame and having a prescribed arcuate contour for directing the path of blade travel in a predetermined curvilinear path to effect cutting on an arcuate contour of a foamed cushion supported on said conveyor.

2. An apparatus as claimed in claim 1 further comprising means above said cutter blade limiting vertical displacement of the cushion with respect to said blade.

3. An apparatus as claimed in claim 1, said conveyor being displaceable rectilinearly.

4. An apparatus as claimed in claim 1, said conveyor including an endless belt.

5. An apparatus as claimed in claim 1, said conveyor including guide rails and a cushion supporting table mounted on said guide rails for horizontal reciprocation.

6. An apparatus as claimed in claim 1, said blade guide means including movable and securable brackets carried by said frame and adapted to alter the configuration of said cutter blade selectively.

7. An apparatus as claimed in claim 1, said cutter blade positioned to cut a supported cushion along the leading and trailing edges as the cushion moves along said conveyor.

8. An apparatus as claimed in claim 1, said cutter blade positioned to cut a supported cushion along the upper and lower planar surfaces as the cushion moves along said conveyor.

9. An apparatus as claimed in claim 1 further comprising buffing means positioned adjacent said cutter blade buffing edges remaining on a cushion as said blade cuts the cushion.

10. An apparatus as claimed in claim 2, said limiting means including horizontal cushion-engaging means positioned above said conveyor and adapted to engage and guide a foamed cushion carried by said conveyor.

11. An apparatus as claimed in claim 2, said conveyor including a flexible conveyor covering having adjustable means for shaping said covering to accommodate a cushion having a pre-cut contoured planar surface so that the cushion is securably supported by said conveyor during the subsequent cutting of the opposite planar surface by the cutter blade.

12. An apparatus as claimed in claim 2, said limiting means including horizontal cushion-engaging means positioned above said conveyor and adapted to engage and guide a polyfoam cushion carried by said conveyor, said blade guide means including movable and securable brackets carried by said frame and adapted to alter the contour of said cutter blade upon movement thereof, said cutter blade positioned to cut a supported cushion along the leading and trailing edges as the cushion moves along said conveyor.

13. An apparatus as claimed in claim 2, said limitnig means including horizontal cushion-engaging means positioned above said conveyor and adapted to engage and guide a foamed cushion carried by said conveyor, said limiting means also including a vertical guide assembly secured to said frame proximate said conveyor and adapted to engage and guide a foamed cushion carried by said conveyor, said blade guide means including movable and securable brackets carried by said frame adapted to alter the configuration of said cutter blade selectively, said cutter blade positioned to cut a supported cushion along the upper and lower planar surfaces as the cushion moves along said conveyor, said conveyor including a flexible conveyor covering having adjustable means for shaping said covering to accommodate a cushion having a precut contoured surface so that the cushion is securably supported by said conveyor during subsequent cutting by the cutter blade.

14. An apparatus as claimed in claim 3, said blade driving means including a motor driven pulley for driving said blade mounted to said base framework.

15. An apparatus as claimed in claim 3, said limiting means including horizontal cushion-engaging means positioned above said conveyor and adapted to engage and guide a foamed cushion carried by said conveyor, said blade guide means including movable and securable brackets carried by said frame and adapted to alter the contour of said cutter blade upon movement thereof, said cutter blade positioned to cut a supported cushion transversely as the cushion moves along said conveyor and said blade driving means including a motor driven pulley for driving said blade mounted to said base framework.

16. An apparatus as claimed in claim 11 further comprising buffing means positioned adjacent said cutter blade buffing at least one edge remaining on a cushion as said blade cuts the cushion.

17. An apparatus as claimed in claim 13 further comprising buffing means positioned adjacent said cutter blade buffing edges remaining on a cushion as said blade cuts the cushion.

18. An apparatus as claimed in claim 15 further comprising buffing means positioned adjacent said cutter blade buffing at least one edge remaining on a cushion as said blade cuts the cushion.

References Cited

UNITED STATES PATENTS

| | | | |
|---|---|---|---|
| 317,469 | 5/1885 | Moses et al. | 83—201.15 |
| 1,088,573 | 2/1914 | Heldmann | 83—201.15 |
| 1,118,610 | 11/1914 | Winchester | 83—201.14 |
| 1,473,961 | 11/1923 | McPhee | 143—85X |
| 2,809,680 | 10/1957 | Nethery, Jr., et al. | 143—85X |
| 1,129,360 | 2/1915 | Niebling | 83—201.14 |

JAMES M. MEISTER, Primary Examiner

U.S. Cl. X.R.

83—201.15; 143—85